United States Patent
Itami et al.

(10) Patent No.: US 7,671,884 B2
(45) Date of Patent: Mar. 2, 2010

(54) ROTARY DRIVE APPARATUS, OPTICAL SCAN APPARATUS, AND IMAGE FORMATION APPARATUS

(75) Inventors: Yukio Itami, Yokohama (JP); Kensuke Masuda, Kodaira (JP); Yoshihiro Takahashi, Miyagi (JP); Tomotaka Takamura, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/071,578

(22) Filed: Feb. 22, 2008

(65) Prior Publication Data

US 2008/0204539 A1  Aug. 28, 2008

(30) Foreign Application Priority Data

Feb. 26, 2007  (JP)  ............... 2007-046276

(51) Int. Cl.
  *B41J 27/00* (2006.01)
(52) U.S. Cl. .................................... 347/261
(58) Field of Classification Search ................. 347/231, 347/243, 259–261; 310/67 R; 359/200.1; 250/234
  See application file for complete search history.

(56) References Cited

U.S. PATENT DOCUMENTS

| | | | |
|---|---|---|---|
| 4,623,216 A * | 11/1986 | Sato et al. ............. | 359/200.1 |
| 5,069,515 A | 12/1991 | Itami et al. | |
| 5,698,915 A * | 12/1997 | Fukuyama et al. ....... | 310/67 R |
| 5,726,699 A | 3/1998 | Itami et al. | |
| 5,739,602 A | 4/1998 | Suzuki et al. | |
| 5,769,544 A | 6/1998 | Suzuki et al. | |
| 5,910,853 A * | 6/1999 | Yutaka ................... | 359/200.1 |
| 6,580,186 B1 | 6/2003 | Suzuki et al. | |
| 6,778,203 B2 | 8/2004 | Itami et al. | |
| 6,822,775 B2 | 11/2004 | Suzuki et al. | |
| 7,126,737 B2 | 10/2006 | Atsuumi et al. | |
| 7,145,705 B2 | 12/2006 | Hayashi | |
| 2006/0061847 A1 | 3/2006 | Itami | |
| 2006/0208179 A1 * | 9/2006 | Itami ...................... | 250/234 |
| 2007/0146852 A1 | 6/2007 | Itami | |
| 2007/0153349 A1 | 7/2007 | Itami | |

FOREIGN PATENT DOCUMENTS

| | | |
|---|---|---|
| JP | 2003-70194 | 3/2003 |
| JP | 2005-92129 | 4/2005 |

* cited by examiner

*Primary Examiner*—Hai C Pham
(74) *Attorney, Agent, or Firm*—Dickstein Shapiro LLP

(57) ABSTRACT

A rotary drive apparatus includes a rotary body with a support portion, a rotor magnet supported by the support portion of the rotary body, a fixation section facing the rotor magnet and rotatably supporting the rotary body, and a winding coil provided in the fixation section, in which an expression $E1/E2 \leq 0.75$ is satisfied where Young's modulus of the rotor magnet is E1 [GPa], and Young's modulus of the support portion is E2 [GPa].

12 Claims, 12 Drawing Sheets

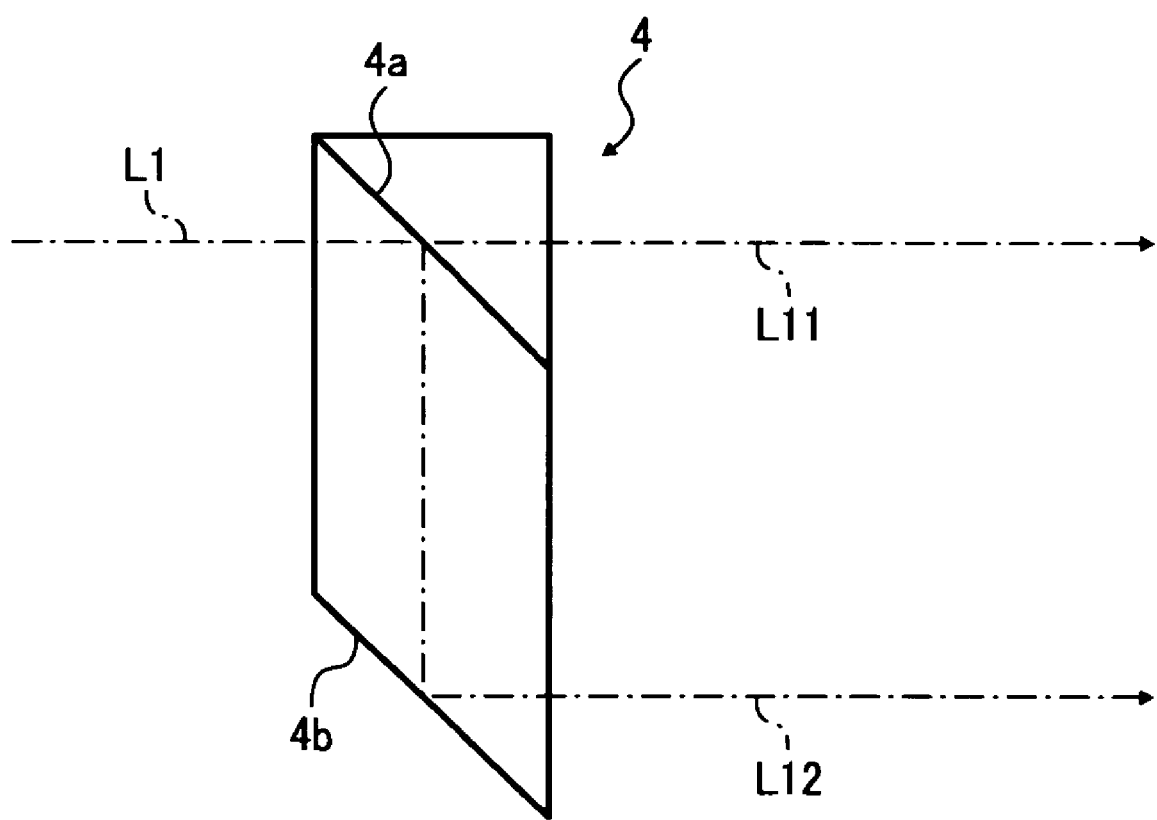

ROTARY DRIVE APPARATUS, OPTICAL SCAN APPARATUS, AND IMAGE FORMATION APPARATUS

CROSS REFERENCE TO RELATED APPLICATION

The present application is based on and claims priority from Japanese Patent Application No. 2007-046276, filed on Feb. 26, 2007, the disclosure of which is hereby incorporated by reference herein in its entirety.

BACKGROUND OF THE INVENTION

1. Field of the Invention

The present invention relates to a rotary drive apparatus, particularly to a rotary drive apparatus suitable for use in an image formation apparatus such as a copier, a printer or the like, and to an optical scan apparatus and an image formation apparatus including the rotary drive apparatus.

2. Description of the Related Art

In order to form images at high speed or form high-precision images by an electrophotographic image formation apparatus, it is necessary to rotate a rotary body therein such as a polygon mirror at a speed of 30,000 rpm or more with high precision. However, there is a drawback in the high speed rotation of the rotary body that the rotary body may be unbalanced, causing a motor thereof to vibrate, or temperature rises in the rotary body due to heat emission from a rotating motor.

Although it is possible to correct and suppress the unbalance of the rotary body in a stationary state, the heat emission during the rotation of the motor may change the unbalance of the rotary body corrected in the stationary state.

The change of the balance of the rotary body due to the temperature increases occurs since components of the rotary body differ from each other in thermal expansion rate. In particular, one of the components, a rotor magnet with a large thermal expansion rate causes the change of the balance of the rotary body when it is fixed to the rotation axis of the rotary body by an adhesive. Since it is not possible to process the rotation axis of the rotary body to be in a perfect circular shape, it is unable to completely seal the entire circumference and surfaces of the axis of the rotary body with the rotor magnet by the adhesive. Accordingly, when the rotor magnet is fitted into the rotation axis, the axis is always inclined radially, and uneven contact with the rotor magnet occurs. At a high ambient temperature or during high-speed rotation of the rotary body, thermal stress occurs due to a difference in the thermal expansion rate between the uneven contact portions and non-contact portions.

The thermal stress is much larger than adhesive strength of the adhesive so that the fitted portions minutely moves. Especially, the above problems are conspicuous in the polygon mirror since it is rotated at the high speed of 30,000 rpm or more and exposed at the high temperature of 80 degrees or more.

In view of solving the above problems, Japanese Laid-Open Patent Application Publication No. 2003-70194 discloses a rotary drive apparatus with improved reliability which generates less vibration and less noise due to the vibration even at the high rotation speed of 30,000 rpm and at the high temperature.

Moreover, Japanese Laid-Open Patent Application Publication No. 2005-92129 discloses an optical deflector used in a color image formation apparatus and having a plurality of polygon mirrors which are superimposedly disposed in stages in a rotation axis direction and whose deflection mirrors in the respective stages are shifted by a predetermined angle in a rotation direction.

However, when the above optical deflector is rotated at a speed of 40,000 rpm or more for the purpose of image formation at a higher speed with higher precision, the rotor magnet may have a crack due to centrifugal force, causing the balance of the rotary body to change and the vibration thereof to increase.

SUMMARY OF THE INVENTION

In order to solve the above problems, an object of the present invention is to provide a reliable rotary drive apparatus in which the rotor magnet will not have a crack due to centrifugal force even at the rotation speed of 40,000 rpm or more, and which can be manufactured at less cost and achieve resource saving, as well as to provide an optical scan apparatus and an image formation apparatus including the rotary drive apparatus.

According to one aspect of the present invention, a rotary drive apparatus comprises a rotary body with a support portion; a rotor magnet supported by the support portion of the rotary body; a fixation section facing the rotor magnet and rotatably supporting the rotary body, and a winding coil provided in the fixation section, in which the following expression (1) is satisfied:

$$E1/E2 \leq 0.75$$

where Young's modulus of the rotor magnet is E1[GPa], and Young's modulus of the support portion is E2 [GPa].

According to another aspect of the present invention, in the rotary drive apparatus the following expression (2) is satisfied:

$$10 \leq \phi d \leq 30$$

where an outer diameter of the rotor magnet is $\phi d$ [mm].

According to another aspect of the present invention, in the rotary drive apparatus the support portion is made of a non-magnetic metal material.

According to another aspect of the present invention, in the rotary drive apparatus the metal material is an aluminum alloy.

According to another aspect of the present invention, in the rotary drive apparatus the rotor magnet is a rare-earth bond magnet.

According to another aspect of the present invention, in the rotary drive apparatus the rotor magnet is formed by injection molding.

According to another aspect of the present invention, in the rotary drive apparatus the following expression (3) is satisfied:

$$0.8 \leq \alpha 1/\alpha 2 \leq 1.5$$

where a linear expansion coefficient of the rotor magnet is $\alpha 1$, a linear expansion coefficient of the support portion is $\alpha 2$.

According to another aspect of the present invention, in the rotary drive apparatus the rotor magnet is press-fitted into the support portion and supported by the support portion.

According to another aspect of the present invention, in the rotary drive apparatus the rotor magnet is attached to the support portion by an adhesive, and the adhesive is 70 or more in type-D durometer hardness defined by JIS-K-7215.

According to another aspect of the present invention, in the rotary drive apparatus the rotary body has a polygon mirror fixed thereto.

According to still another aspect of the present invention, an optical scan apparatus comprises: an optical deflector comprising a polygon mirror and rotating around a predetermined rotation axis to scan a scanning plane with a light beam; and a rotary drive apparatus comprising a rotary body with a support portion, a rotor magnet supported by the support portion of the rotary body, a fixation section facing the rotor magnet and rotatably supporting the rotary body, and a winding coil provided in the fixation section, to rotate the optical deflector, in which an expression (1), $E1/E2 \leqq 0.75$ is satisfied where Young's modulus of the rotor magnet is E1[GPa], and Young's modulus of the support portion is E2 [GPa].

According to still another aspect of the present invention, an image formation apparatus comprises: the above-described optical scan apparatus; a photoreceptor on which an electrostatic latent image is formed on a scanned surface by the optical scan apparatus; a developer section which visualizes, as a toner image, the electrostatic latent image formed on the scanned surface of the photoreceptor; and a transfer section which fuses the toner image visualized by the developer section on a recording medium.

BRIEF DESCRIPTION OF THE DRAWINGS

FIG. 8 shows an action of a half mirror prism 4 shown in FIG. 7;

DETAILED DESCRIPTION OF THE PREFERRED EMBODIMENTS

First Embodiment

Figure 1:
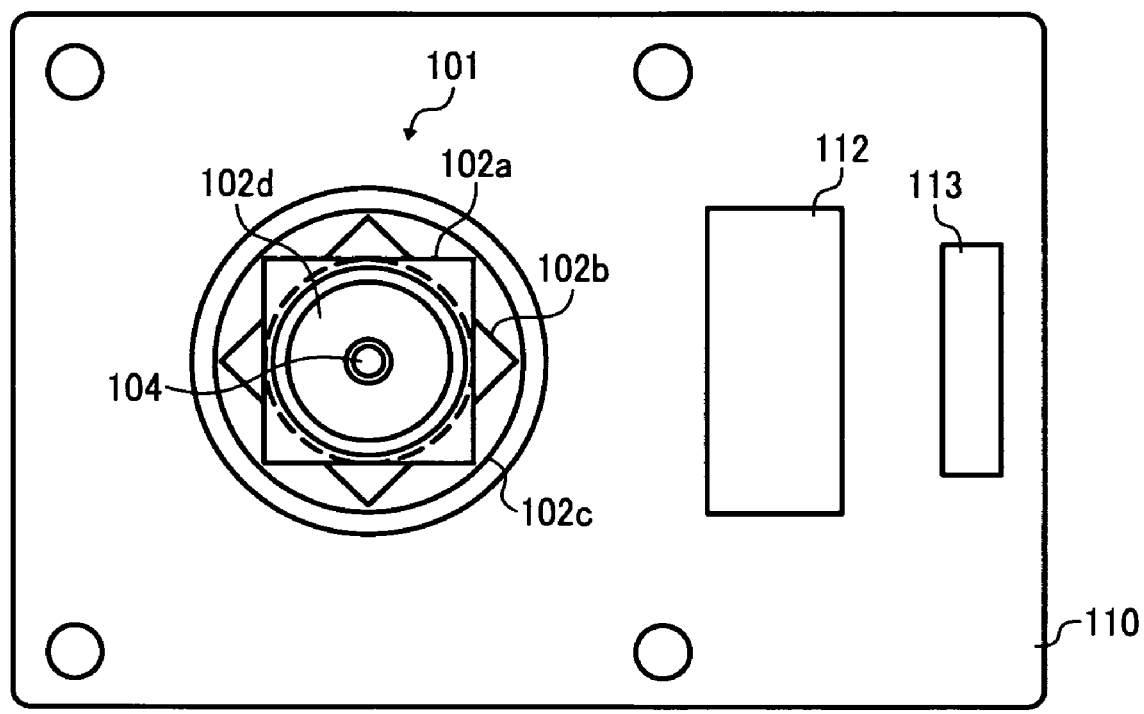
FIG. 1 is a top view showing a structure of a rotary drive apparatus (optical deflector) according to a first embodiment of the present invention.

First, the features of a rotary drive apparatus according to the first embodiment of the present invention will be described. The rotary drive apparatus according to the present embodiment is configured to comprise a rotary body (101) with a support portion (102c), a rotor magnet (103) supported by the support portion of the rotary body (101), a fixation section (106) facing the rotor magnet (103) and rotatably supporting the rotary body, and a winding coil (107a) provided in the fixation section (106). The rotary drive apparatus is configured to satisfy the following expression (1):

$$E1/E2 \leqq 0.75$$

where Young's modulus of the rotor magnet 103 is E1 [GPa], and Young's modulus of the support portion 102c is E2 [GPa].

With such a configuration, it is possible to realize a reliable rotary drive apparatus in which the rotor magnet will not have a crack due to centrifugal force even at a rotation speed of 40,000 rpm or more, and which can be manufactured at less cost and achieve resource saving.

Hereinafter, the rotary drive apparatus according to the first embodiment will be described in detail with reference to the accompanying drawings.

Figure 2:
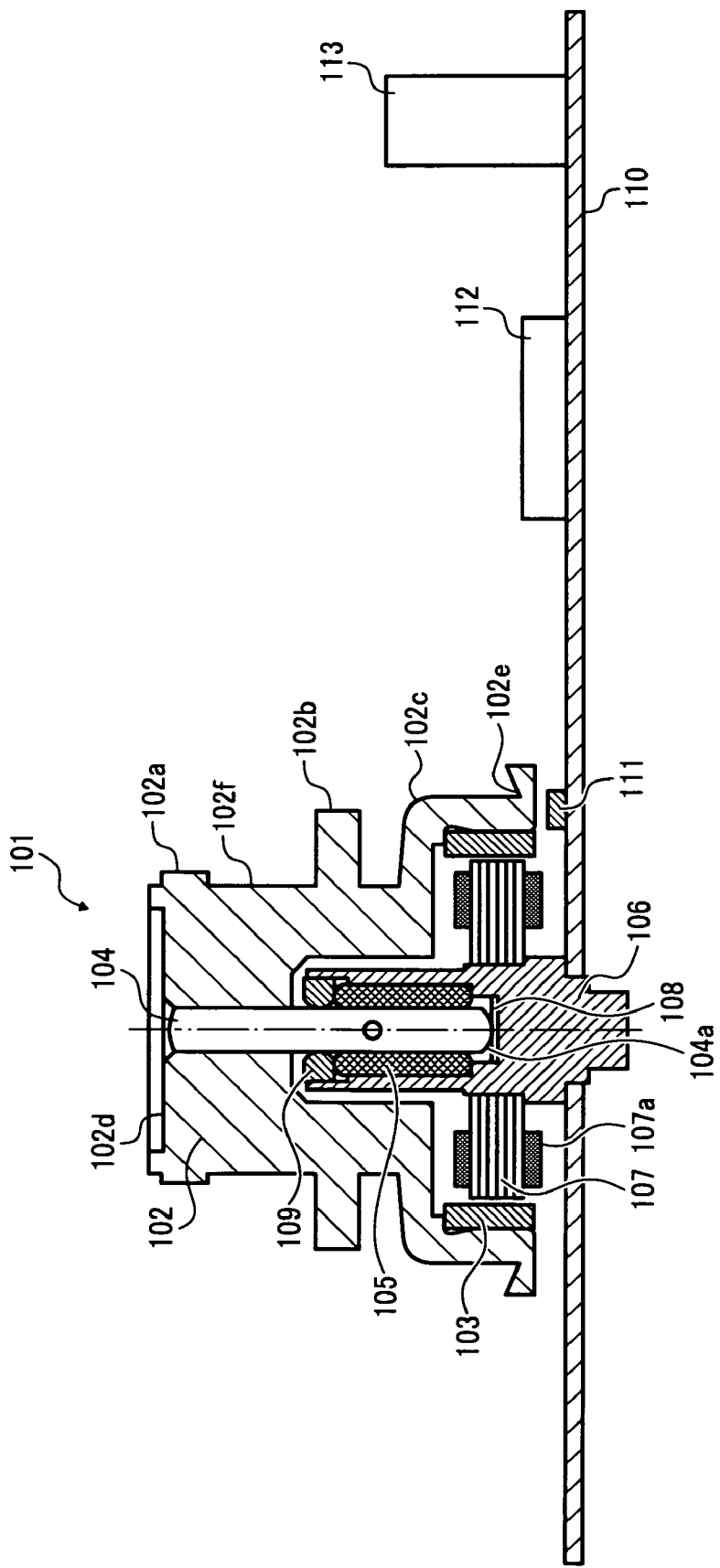
FIG. 2 a cross sectional view of the structure of the rotary drive apparatus (optical deflector) according to the first embodiment of the present invention.
Figure 3:
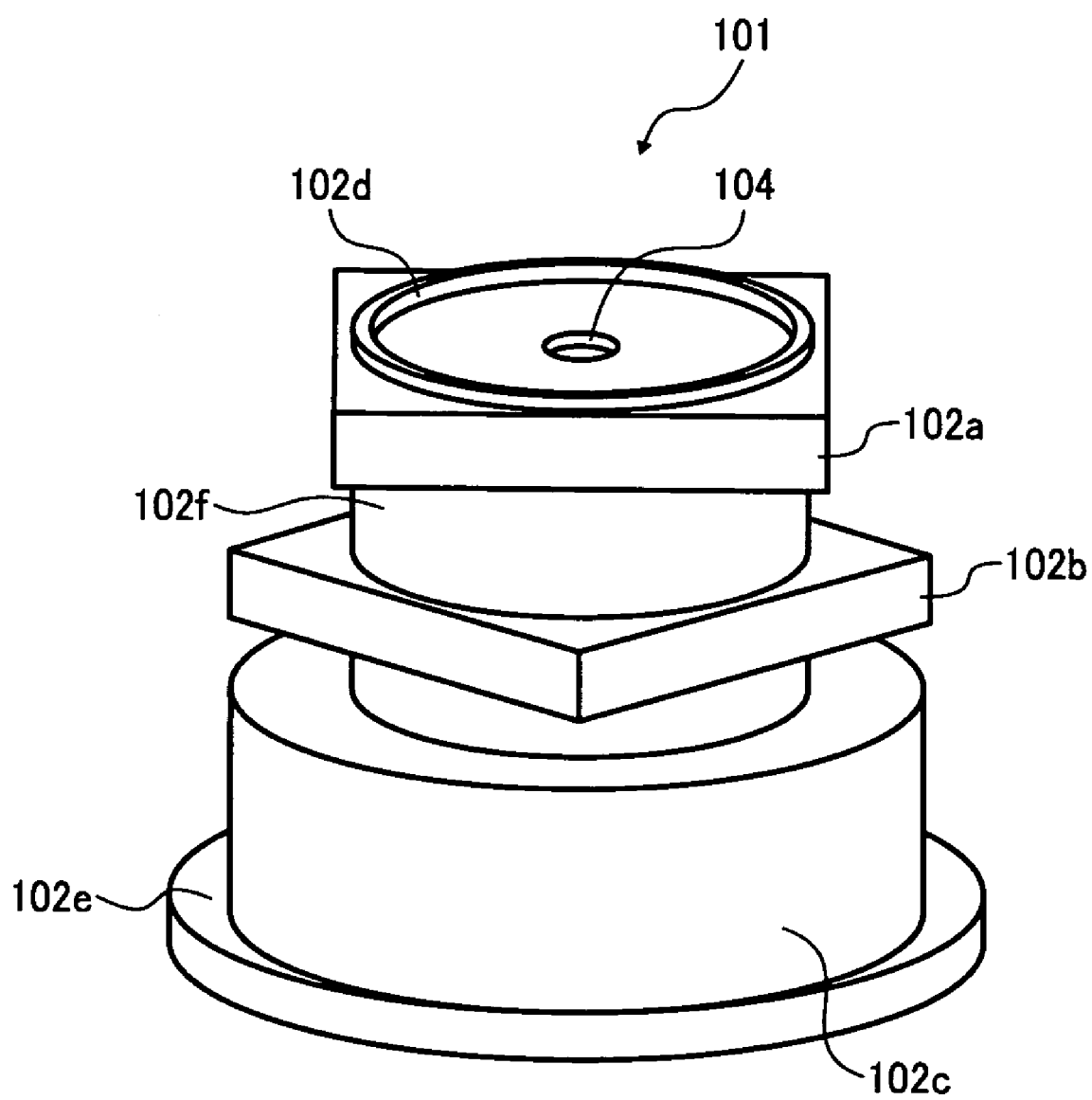
FIG. 3 is a perspective view of the structure of the rotary drive apparatus (optical deflector) according to the first embodiment of the present invention.

FIGS. 1 to 3 show an example of the structure of an optical deflector as an example of the rotary drive apparatus according to the present embodiment. FIG. 1 shows a top view of the optical deflector, FIG. 2 is a cross sectional view thereof, and FIG. 3 is a perspective view thereof.

The rotary body 101 as the optical deflector is constituted of an upper polygon mirror 102a, a lower polygon mirror 102b, and a flange 102c supporting a rotor magnet 103. The rotary body 101 is shrink-fitted to the outer circumference of a rotation axis 104.

The radial bearing 105 is an oil-impregnated dynamic pressure bearing, and a gap thereof is set to be 10 μm or less in diameter. In order to secure a stable high-speed rotation of the rotary body 101, the radial bearing is provided with a not-shown dynamic pressure groove. Generally, the dynamic pressure groove is provided in the outer circumference of the rotation axis 104 or the inner circumference of the radial bearing 105, however, it is preferable that it is provided in the inner circumference of the radial bearing 105 which is made of a sintered member with a good workability. The material of the rotation axis 104 is preferably a quenchable martensite stainless steel (for example, SUS420J2) because of its high surface hardness and anti-friction performance.

The rotor magnet 103 is fixed on the inner surface of a lower part of the flange 102c, and constitutes a brushless motor of an outer rotor type together with a stator core 107 (winding coil 107a) fixed to a bearing housing 106. The rotor magnet 103 is a bond magnet using a resin as a binder and is supported at its outer diameter portion by the flange 102c for the purpose of preventing destruction during the high-speed rotation due to centrifugal force.

A thrust bearing 108 in a thrust direction faces a convex plane 104a formed on the bottom end of the rotation axis 104 and is a pivot bearing for receiving the convex plane 104. The thrust bearing 108 is preferably made of a martensite stainless steel, ceramics, a metal member whose surface is hardened through the DLC process (Diamond like Carbon) or the like, or a resin material, etc and has a good lubricating property. Because of this, it is able to suppress generation of powder particles due to the wear. The radial bearing 105 and the thrust bearing 108 are contained in the bearing housing 106, and oil leak therefrom is prevented by a fluid seal 109.

For rotating the rotary body 101 at a high speed of 25,000 rpm or more, it is necessary to adjust and maintain the balance of the rotary body 101 accurately so as to reduce the vibration thereof. The rotary body 101 has two balance adjusting portions in the upper and lower parts thereof. One is a concave circumferential portion 102d on the upper surface of the rotary body 101 and the other is a concave circumferential portion 102e of the flange 102c. The concave portions 102d, 102e are coated with respective adhesives for the balance adjustment. The amount of unbalance is needed to be 10 mg·mm or less, therefore, a difference in mass among portions on a radius of 10 mm is set to be maintained at 1 mg or less, for example.

In a case where the balance adjustment through the coating with the adhesives is difficult to achieve or the adhesives are exfoliated or dispersed at the rotation speed of 40,000 rpm or more since the amount thereof is too little and their adhesivities are weak, it is preferable to remove a part of a component of the rotary body by drilling, cutting or laser processing instead of performing such a minute adjustment.

The motor system according to the present embodiment is of an outer rotor type which radially has a magnetic gap and in which the rotor magnet 103 is laid out on the outer circumference of the stator core 107. The rotor body 101 is rotated by excitation switching of the winding coil 107a by a driver IC 112, referring to signals as position signals outputted from a hall element 111 mounted on a circuit board 110 due to a magnetic field of the rotor magnet 103. The rotor magnet 103 is radially magnetized and generates rotation torque for rotation between the outer circumference of the stator core 107. Magnetic paths of the rotor magnet 103 are open radially and vertically and the hall element 111 for excitation switching of the motor is disposed on the open magnetic paths.

The numeric code 113 represents a connector connected with a not-shown harness. Via the connector 113, power is supplied from exterior, the driving of the motor is stopped, or control signals for the rotation speed or the like are outputted/inputted.

The upper and lower polygon mirrors 102a, 102b are connected through a connecting portion 102f. The respective deflection surfaces of the upper and lower polygon mirrors 102a, 102b are fixed with a shift of 45 degrees (phase difference) in the rotation direction.

Note that the upper and lower polygon mirrors 102a, 102b are radially smaller in size than the motor. This is because the polygon mirrors are downsized for the purpose of reducing the materials of the rotary body 101 to decrease burdens on the environment and reducing windage loss caused by the rotation of the polygon mirrors to reduce noise and rotary energy thereof.

Next, the features of the rotary drive apparatus according to the present embodiment will be described with reference to FIGS. 1 to 3, FIG. 4 to 6 and Table 1.

The outer circumference of the rotor magnet 103 is fixed to an inner surface of the bottom of the flange 102c in order to prevent it from being destructed due to the centrifugal force during the high-speed rotation. Note that the inventors of the present invention have conducted a continuous drive test at the rotation speed of 40,000 to 60,000 rpm for the conventional rotary drive apparatus using a bond magnet made by compression molding. As a result, a crack has occurred in the rotor magnet 103.

In order to find the cause of the crack in the rotor magnet 103, the inventors of the present invention have made a simulation (structural analysis) of deformation of the rotor magnet due to the centrifugal force. An analysis model for the rotary drive apparatus is one-fourth periodic model with its symmetric axis as a rotation axis. The material property of the flange and rotor magnet used in the simulation is shown in Table 1.

TABLE 1

| Component | Material | Young Modulus (Gpa) | Poisson Ratio | Linear Expansion Coefficient (×10⁻⁵/° C.) | Density (kg/m³) |
|---|---|---|---|---|---|
| Flange (Polygon mirror) | Alminum Alloy | 68 | 0.36 | 2.5 | 2,700 |
| Rotor Magnet | Rare-earth Bond Magnet | 10-100 | 0.30 | 2.6 | 5,300 |

Figure 4:
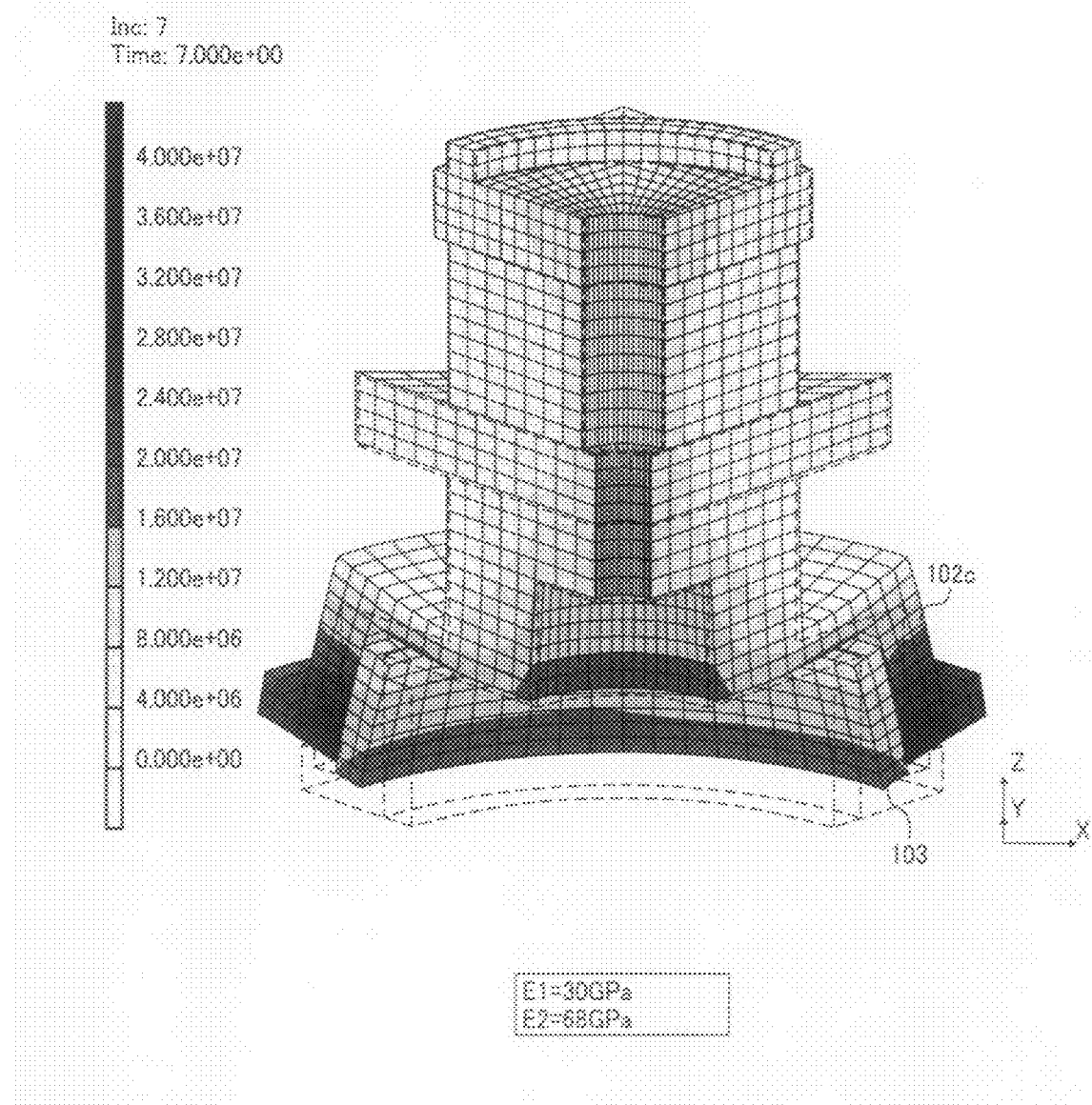
FIG. 4 shows deformation and stress distribution of a rotor magnet 103 and a flange 102c when E/E2=0.44 where E1 is Young's modulus of the rotor magnet 103 and E2 is Young's modulus of the flange 102c)
Figure 5:
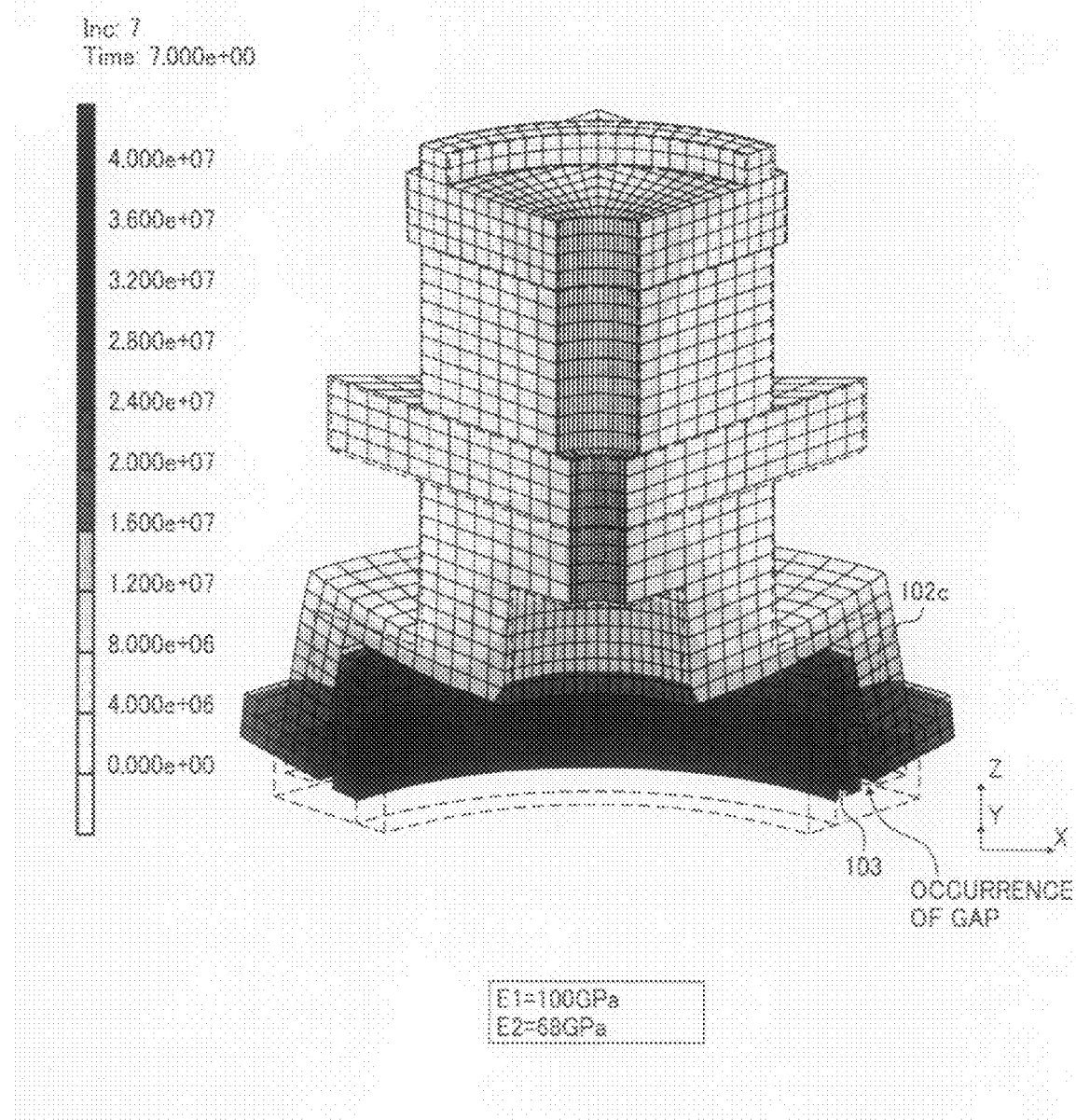
FIG. 5 shows deformation and stress distribution of the rotor magnet 103 and the flange 102c when E/E2=1.47 where E1 is Young's modulus of the rotor magnet 103 and E2 is Young's modulus of the flange 102c)
Figure 6:
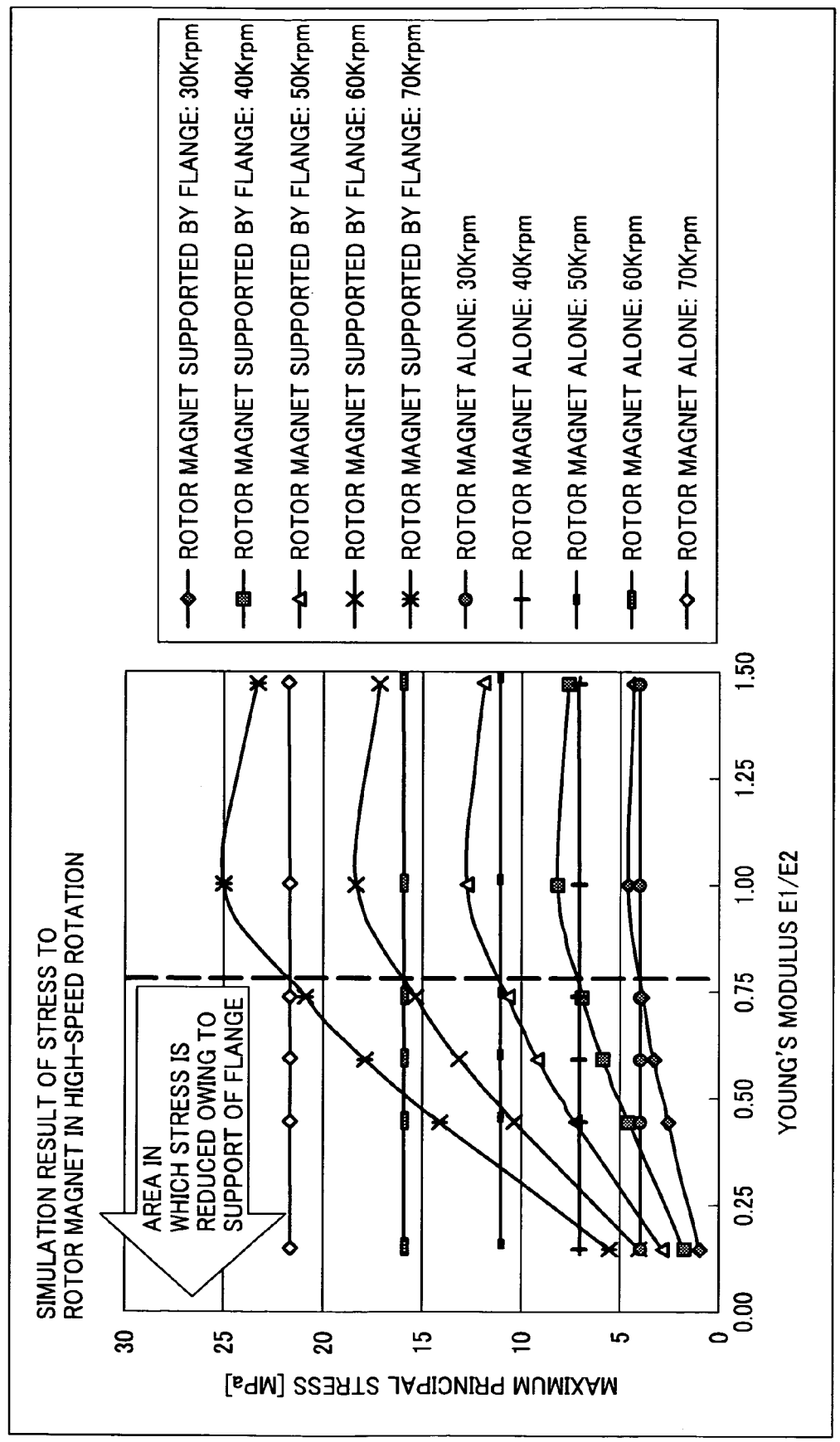
FIG. 6 shows a calculated result of stress (maximum principal stress) to the inner circumference of the bottom end of the rotor magnet 103.

In addition, the simulation results shown in FIGS. 4 to 6 are obtained when the outer diameter of the rotor magnet 103 is about 18 mm, and the inner diameter thereof is 16 mm, and it is assumed that the initial gap between the rotor magnet 103 and the flange 102c is zero. It is found out that the flange 102c is deformed such that the bottom portion thereof is greatly splayed out such as a circular cone due to the centrifugal force by the high-speed rotation.

FIG. 4 shows the deformation and stress distribution of the optical deflector when the Young modulus E1, E2 of the rotor magnet 103 and the flange 102c is substantially small such as E1/E2=0.44, where Young's modulus E2 of the flange 102c is 68 GPa and that of the rotor magnet 103 is 30 GPa. In the drawing, however, the amounts of deformation of the respective portions are enlarged and exaggerated, and the portions in darker color are subject to a larger stress. The stress to the rotor magnet 103 is largest at the inner circumference of the bottom end portion.

As shown in FIG. 4, the rotor magnet 103 is deformed into a circular cone shape in accordance with the conical deformation of the flange 102c. In this case, although the stress to the rotor magnet 103 is largest at the inner circumference of the bottom portion, the deformation of the rotor magnet 103 is suppressed since it is supported by the flange 102c. The stress to the rotor magnet 103 is smaller than that when it is rotated alone, so that it is not likely to have a crack.

FIG. 5 shows the deformation and stress distribution of the optical deflector when the Young modulus E1, E2 of the rotor magnet 103 and the flange 102c is substantially large such as E1/E2=1.47, where Young's modulus E2 of the flange 102c is 68 GPa and that of the rotor magnet 103 is 100 GPa. In the drawing, however, the amounts of deformation of the respective portions are enlarged and exaggerated, and the portions in darker color are subject to a larger stress.

As shown in FIG. 5, the rotor magnet 103 is deformed into a substantially cylindrical shape not in accordance with the conical deformation of the flange 102c. In this case, there occurs a gap between the outer circumference of the bottom end portion of the rotor magnet 103 and the flange 102, which eliminates the effect of the flange 102c's supporting rotor magnet 103. The stress to the rotor magnet 103 is larger than that when it is rotated alone (to be described later). The rotor magnet 103 in FIG. 5 is in a darker color as a whole than that in FIG. 4, and the stress to the inner circumference of the bottom end portion is large, so that it is likely to cause a crack therein.

FIG. 6 is a graph showing the simulation results of the stress (maximum principal stress) to the inner circumference of the bottom end portion of the rotor magnet 103 by the centrifugal force. In the graph, the horizontal axis represents Young's modulus E1 of the rotor magnet 103 relative to Young's modulus E2 of the flange 102c. In the simulation, the rotation speed is used for a parameter, and the stress is calculated at every 10,000 rotations from 30,000 to 70,000 rotations (30 krpm to 70 krpm). The graph shows that the stress increases as the rotation speed increases. In the graph, when the Young's modulus E1 of the rotor magnet 103 and that E2 of the flange 102c is equivalent to each other, that is, at 1.00 in the horizontal axis, the stress reaches a peak at every rotation speed.

FIG. 6 also shows the simulation results of the rotor magnet 103 when rotated alone, and they are straight lines in parallel to the horizontal axis. That is, it can be said that with the rotor magnet 103 rotated alone, the stress thereto is constant irrespective of the ratio of the Young's modulus E1 of the rotor magnet 103 and that E2 of the flange 102c.

Further, in comparing the rotor magnet 103 supported by the flange 102c and the rotor magnet 103 alone at the same rotation speed, their results intersect with each other at the periphery of 0.75 in the horizontal axis. In other words, at about 0.75 or more in the horizontal axis, the stress to the rotor magnet 103 supported by the flange 102c is larger than that to the rotor magnet 103 alone, while at about 0.75 or less, the former is smaller than the latter. In conclusion, the left side of the graph (indicated by the arrow and broken line) is the area in which the stress to the rotor magnet 103 is reduced owing to the support by the flange 102c.

Accordingly, in order to reduce the centrifugal stress to the rotor magnet 103 by being supported by the flange 102c in the rotary drive apparatus according to the present embodiment, it is necessary to satisfy the following expression (1):

$$E1/E2 \leq 0.75$$

where Young's modulus of the rotor magnet 103 is E1 [GPa] and that of the flange 102c is E2 [GPa].

Since the rotary drive apparatus according to the present embodiment is configured to satisfy the expression (1), the outer circumference of the rotor magnet 103 is securely supported during the high-speed rotation by the support portion of the rotary body 101, deforming in accordance with the deformation of the support portion. Thereby, the centrifugal stress to the rotor magnet 103 is reduced so that it is preventable of the occurrence of a crack in the rotor magnet 103 even in the high-speed rotation of 40,000 rpm or more.

In addition, with regard to the size of the rotor magnet 103, the outer diameter is preferably set to 30 mm or less since the larger the size is, the larger the centrifugal force is in proportional with a square of the radius thereof.

From the viewpoint of decreasing the centrifugal stress, it is preferable that the rotor magnet 103 has a smaller diameter; however, it needs to have a diameter of about 10 mm to generate a drive torque substantially against the load at the high-speed rotation of 40,000 rpm or more. Also, it is easy to manufacture the stator core 107 or the winding coil 107a of a diameter 10 mm or more. Consequently, the outer diameter φd [mm]) of the rotor magnet 103 is preferably set to satisfy the following expression (2):

$$10 \leq \phi d \leq 30.$$

The rotary drive apparatus according to the present embodiment is configured that the rotor magnet 103 has a diameter satisfying the expression (2) so that it can generate substantial amount of drive torque. Also, the stator core 107 and winding coil 107a can be easily manufactured.

In terms of the material of the support portion (flange 102c), it is preferably made of nonmagnetic metal material such as aluminum alloy. With the flange 102c of the nonmagnetic material, it is made possible to dispose the hall element 111 outside the rotor magnet 103 for the excitation switching even when the rotor magnet 103 is small in size, making smaller the influence from excitation noise and making it easier to detect a position of magnetic pole than the hall element disposed inside the rotor magnet 103. Also, using the aluminum alloy, the size of the support portion for the rotor magnet 103 can be formed with high precision, so that it can securely support the rotor motor 103.

Further, according to the rotary drive apparatus of the present embodiment, the rotor magnet 103 is preferably a rare-earth bond magnet in which powder of neodymium (Nd), iron (Fe), boron (B) or the like is combined with resin such as nylon or PPS (polyphenylene sulfide) by injection molding. The rotor magnet 103 as configured above has relatively high magnetic property, and can obtain necessary drive torque even when the size thereof is small.

In comparing the rare-earth bond magnet made by injection molding with that made by compression molding, material ratio of resin is high in the former. With the use of the flange 102c made of aluminum alloy, the Young's modulus of the rotor magnet 103 is easily set to be 75% or less than that of aluminum so that the rotor magnet 103 deforms similarly to the flange 102c during the high-speed rotation.

Furthermore, in the rotary drive apparatus according to the present embodiment the linear expansion coefficient (α1) of the rotor magnet 103 and that (α2) of the flange 102c are preferably set to satisfy the following expression (3):

$$0.8 \leq \alpha 1/\alpha 2 \leq 1.5$$

In general, the optical deflector is used at temperature of about 80 degrees at maximum and stored at ambience temperature of −30 degrees. Assuming that the optical deflector is assembled at normal temperature of 25 degrees, there is ±55 degrees difference therebetween. For coping with the difference in the high temperature ambience, the linear expansion coefficients of the rotor magnet 103 and the flange 102c are preferably set to satisfy $1.0 \leq \alpha 1/\alpha 2$ in the high temperatures, thereby preventing occurrence of a gap therebetween. However, at around $0.8 \leq \alpha 1/\alpha 2$, it is sufficient to suppress a variation of the gap to 10 μm or less in diameter. Especially, when the rotor magnet 103 is attached to the flange 102c by an adhesive, thermal expansion of the adhesive can prevent an increase of the gap therebetween.

The optical deflector is not driven at the low temperature ambience in storage. At $\alpha 1/\alpha 2 \leq 1.5$, the rotor magnet 103 can be prevented from loosening or falling off at the low temperature.

As described above, the linear expansion coefficients of the rotor magnet 103 and the flange 102c are set to satisfy the expression (3) so that the rotor magnet 103 can be hold securely by the flange 102c even around the maximum operation temperature to prevent the occurrence of a crack due to the centrifugal force therein and prevent the rotor magnet 103 from loosening at the low storage temperature.

Moreover, it is preferable that the rotor magnet 103 is press-fitted into the flange 102c so that it can be directly supported by the flange 102c. This enables reduction in the centrifugal stress applied to the rotor magnet 103 without a failure. In the press-fitting, the linear expansion coefficient α1 of the rotor magnet 103 and that α2 of the flange 102c are preferably equivalent to each other. When there is a difference therebetween, the adhesive can be also used for preventing the rotor magnet 103 from loosening due to the temperature changes.

Also, it is possible to attach the rotor magnet 103 to the flange 102c by use of an adhesive. In this case, the adhesive is preferably 70 or more in type-D durometer hardness (23° C.) defined by JIS-K-7215. This is because as different from the press fitting, the adhesive interposes between the rotor magnet 103 and the flange 102c, and the use of an adhesive with low hardness may cause the rotor magnet 103a to crack. With the use of the adhesive with 70 or more type-D durometer hardness, the rotor magnet 103 can be supported as securely as the direct support by the flange 102c, reducing the centrifugal stress thereto.

For the adhesive, acrylic adhesives (for example, "Hard-Loc" manufactured by Denki Kagaku Kogyo Kabushiki Kaisha) and epoxy adhesives ("2200 series" manufactured by Threebond Co. Ltd.) are preferable. With the use of the adhesive, mirror precision of the polygon mirror is not degraded since it is not subject to stress at the assembly of the rotor magnet 103.

The present embodiment has described as an example of the rotary drive apparatus the rotary body 101 in which the polygon mirrors 102a, 102b and the connecting portion 102f are integrated with the flange 102c. The present invention is not limited thereto. The flange 102c and the polygon mirrors 102a, 102b can be separated from each other.

Moreover, with regard to the material of the flange 102c, stainless steel plates or the like can be used.

The present embodiment has described the optical deflector as an example of the rotary drive apparatus. The rotary drive apparatus according to the present embodiment is not limited to one for rotating the polygon mirrors 102a, 102b, and is applicable to one for rotating discs or the like.

As described above, according to the present embodiment, it is possible to provide the rotary drive apparatus with a good balance and less vibration without occurrence of cracks in the rotor magnet 103.

Second Embodiment

Next, the second embodiment of the present invention will be described. The second embodiment concerns an optical scan apparatus in which the rotary drive apparatus (optical deflector) according to the first embodiment is mounted. With such a configuration, it is possible to reduce vibration and noise of the polygon mirrors, as well as to reduce the number of components and materials of the light source, leading to suppressing a failure rate of the light source and reducing the burdens on the environment.

Hereinafter, with reference to FIGS. 7 to 10, the optical scan apparatus according to the present embodiment will be described in detail.

(Structure of Optical Scan Apparatus)

Figure 7:
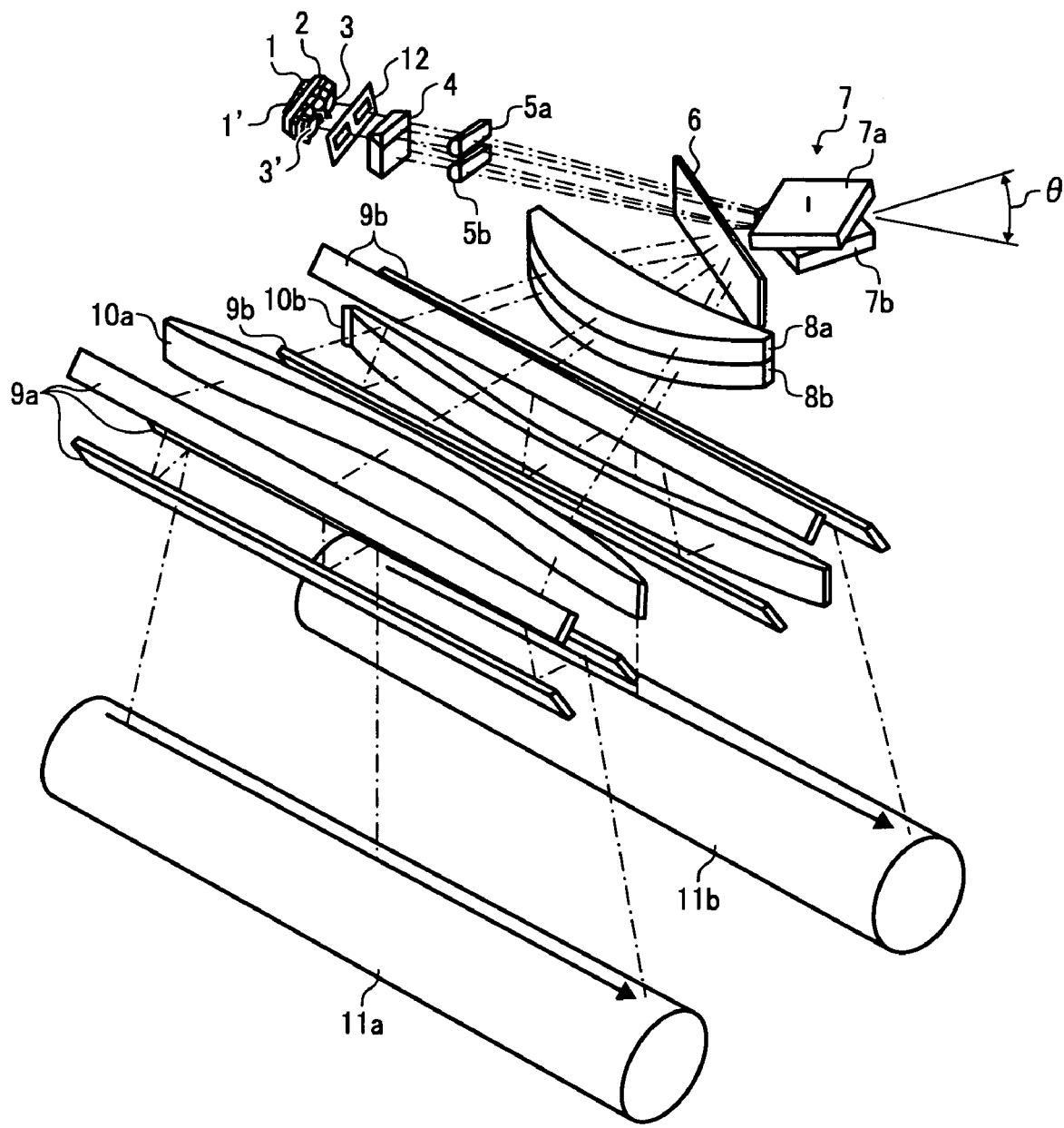
FIG. 7 shows a structure of an optical scan apparatus according to a second embodiment of the present invention.

In FIG. 7, the numeric codes 1, 1' represent semiconductor lasers which constitute a single light source and each emits one light beam. They are supported by a holder 2 to keep a predetermined positional relation.

The light beams from the semiconductor lasers 1, 1' are converted by coupling lenses 3, 3' into light beams of a desired property (parallel light flux, light flux of weak divergence or of weak convergence) in accordance with the subsequent optical system. According to the present embodiment, the light beams are converted into parallel light flaxes by the coupling lenses 3, 3'.

Each light beam with a desired property emitted from the coupling lenses 3, 3' passes through an opening of an aperture 12 to adjust the widths of the light beams, and then incident on a beam splitter prism 4. Each light beam is split into two by the action of the beam splitter prism 4 in the sub scan direction.

FIG. 8 shows the light beam split into two. A vertical direction in FIG. 8 is the sub scan direction. For the sake of simplicity, the light beam L1 represents light beams emitted from the semiconductor laser 1. The beam splitter prism 4 has a half mirror 4a and a reflection surface 4b in parallel in the sub scan direction. The light beam L1 is incident on the half mirror 4a. A part of the light beam L1 straightly transmits through the half mirror 4a to be a light beam L11, and the rest of the light beam L1 is reflected by the half mirror 4a and incident on the reflection surface 4b, and totally reflected thereby and becomes a light beam L12.

The half mirror 4a and the reflection surface 4b are parallel to each other, therefore, the light beams L11, L12 emitted from the beam splitter prism 4 are parallel to each other. The light beam L1 is split into the two light beams L11, L12 in the sub scan direction. Similarly, the light beam from the semiconductor laser 1' is split into two. Two light beams are emitted from a single light source (m=1) and each of the two light beams are split into two (q=2) to obtain four light beams in total.

As shown in FIG. 7, the four light beams are incident on cylindrical lenses 5a, 5b and gathered thereby in the sub scan direction to form a linear image long in the main scan direction near the deflection surface of polygon mirrors of the optical deflector 7.

The light beams are emitted from the semiconductor lasers 1, 1' and split by the beam splitter prism 4, and a part thereof (light beam L11 in FIG. 8) straightly transmits through the half mirror 4a of the beam splitter prism 4 and is incident on the cylindrical lens 5a. A part (light beam L12 in FIG. 8) of the split light beams by the beam splitter prism 4 is reflected by the half mirror 4a and the reflection surface 4b, and incident on the cylindrical lens 5b.

The numeric code 6 in FIG. 7 represents a soundproof glass 6 provided in a window of a soundproof housing of the optical deflector 7. The four light beams from the light source are incident on the optical deflector 7 via the soundproof glass 6 and deflected thereby and emitted to an optical scan and image formation system via the soundproof 6. The optical deflector 7 as shown in FIG. 7 includes an upper polygon mirror 7a and a lower polygon mirror 7b so that they are superimposedly disposed in two stages and integrated with each other. The optical deflector 7 is rotated around a rotation axis by a not-shown drive motor.

According to the present embodiment, the upper and lower polygon mirrors 7a, 7b both have the same shape and have four deflection surfaces. However, the deflection surfaces of the lower polygon mirror 7b are shifted from those of the upper polygon mirror 7a by a predetermined angle θ (45 degrees) in the rotation direction.

Moreover, the numeric codes 8a, 8b represent first scan lenses, 10a, 10b represent second scan lenses, 9a, 9b represent bending mirrors, and 11a, 11b represent photoconductive drums as optical conductive photoreceptors in FIG. 7.

The first scan lens 8a, second scan lens 10a bending mirror 9a guide the two light beams (emitted from the semiconductor lasers 1, 1' and having passed through the half mirror 4a of the beam splitter prism 4) deflected by the upper polygon mirror 7a of the optical deflector 7 to the photoconductive drum 11a to be scanned, thereby constituting an optical scan and image formation system which forms two optical spots spaced in the sub scan direction.

Similarly, the first scan lens 8b, second scan lens 10b, bending mirror 9b guide the two light beams (emitted from the semiconductor lasers 1, 1' and reflected by the half mirror 4a of the beam splitter prism 4 and the reflection surface 4b) deflected by the lower polygon mirror 7b of the optical deflector 7 to the photoconductive drum 11b to be scanned, thereby constituting an optical scan and image formation system which forms two optical spots spaced in the sub scan direction.

The semiconductor lasers 1, 1' are arranged so that the light beams therefrom are crisscrossed with each other in the vicinity of deflection surface seen from the rotation axis direction of the optical deflector. Accordingly, the two light beams incident on the deflection surfaces have a divergence angle (made by a projection of the two light beams on a plane perpendicular to the rotation axis).

With the divergence angle, the respective two light spots on the photoconductive drums 11a, 11b are separated from each other in the main scan direction. Thus, it is able to individually detect the two light beams to scan the photoconductive drums 11a, 11b by an optical sensor and to synchronize the light beams for each light beam at start of scanning.

The photoconductive drum 11a is scanned with the two light beams deflected by the upper polygon mirror 7a of the optical deflector 7. Likewise, the photoconductive drum 11b is scanned with the two light beams deflected by the lower polygon mirror 7b of the optical deflector 7.

As described above, the deflection surfaces of the upper and lower polygon mirror 7a, 7b of the optical deflector 7 are shifted from each other by 45 degrees in the rotation direction. Because of this, when the photoconductive drum 11a is scanned with the light beams deflected by the upper polygon mirror 7a, the light beams deflected by the lower polygon mirror 7b are not guided to the photoconductive drum 11b. Similarly, when the photoconductive drum 11b is scanned with the light beams deflected by the lower polygon mirror 7b, the light beams deflected by the upper polygon mirror 7a are not guided to the photoconductive drum 11a.

Figure 9A:
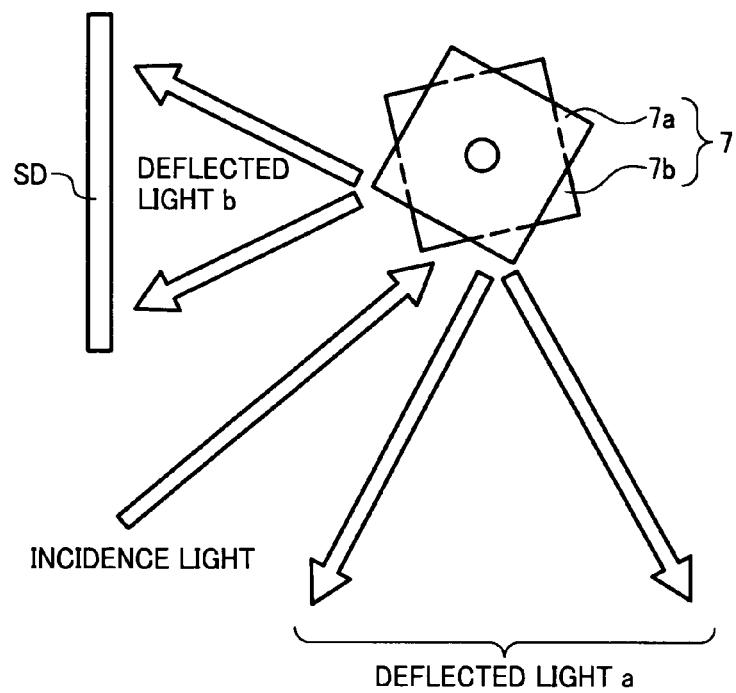
FIGS. 9A, 9B show a function of an optical deflector 7 having a polygon mirror shown in FIG. 7.
Figure 9B:
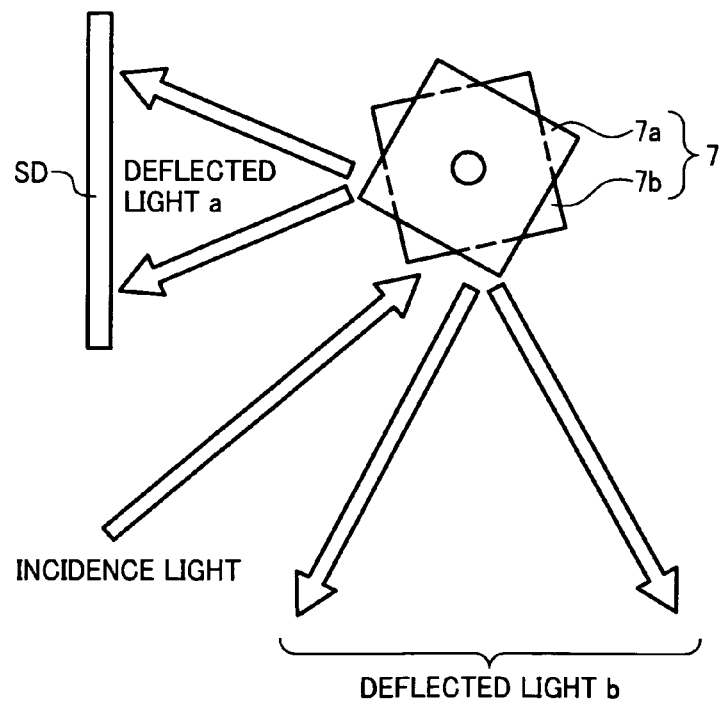

In other words, the photoconductive drums 11a, 11b are scanned with the light beams by turns with a time lag. FIGS. 9A, 9B show the above alternative scanning. In the drawing incidence light represents light beams incident on the optical deflector 7 (actually, four beams), and deflected lights a, b represent light beams deflected.

FIG. 9A shows the incidence light incident on the optical deflector 7, deflected by the upper polygon mirror 7a, and guided to an optical scan position. The deflected light b by the lower polygon mirror 7b is not directed to the optical scan position.

FIG. 9B shows the incidence light incident on the optical deflector 7, deflected by the lower polygon mirror 7b, and guided to the optical scan position. The deflected light a by the lower polygon mirror 7a is not directed to the optical scan position.

Here, in order to prevent the deflected light by one of the polygon mirrors from acting as a ghost light while the deflected light by the other of the polygon mirrors is guided to the optical scan position, it is preferable to employ a light shielding device SD in FIGS. 9A, 9B when appropriate, to shade the deflected light not to be guided to the optical scan position. Actually, this is very feasible by forming the internal walls of the above soundproof housing to be non-reflective.

As described above, according to the present embodiment, the photoconductive drums 11a, 11b are scanned with the light beams alternatively. Therefore, in scanning the photoconductive drum 11a, for example, light intensity of the light source is modulated with an image signal corresponding to a black color image, and in scanning the photoconductive drum 11b, the light intensity thereof is modulated with an image signal corresponding to a magenta color image. This enables formation of an electrostatic latent image of a black image on the photoconductive drum 11a, and formation of an electrostatic latent image of a magenta color image on the photoconductive drum 11b.

Figure 10:
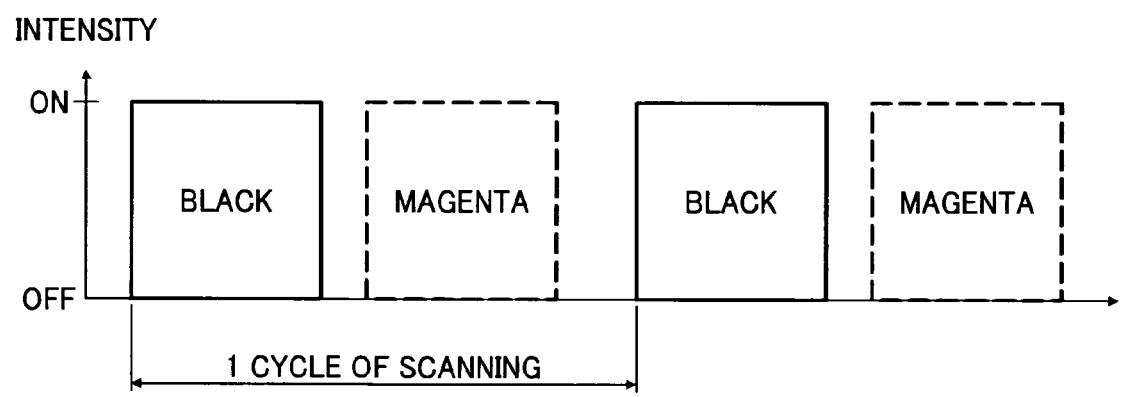
FIG. 10 is an explanatory diagram for light intensity modulation of a light source for writes of a black color image and a magenta color image in the optical scan apparatus according to the second embodiment of the present invention.

FIG. 10 is a timing chart for writing, with a common light source (semiconductor lasers 1, 1' in FIG. 7) a black color image on the entire effective scanning area of the photoconductive drum 11a and a magenta color image on the entire scanning area of the photoconductive drum 11b. The frames of solid lines represent a write for the black color image and the frames of broken lines represent a write for the magenta color image. Note that the timing at which an image is written is determined by the optical sensor's (generally, photodiode) detecting the light beam to the optical scan position, as described above.

The optical scan apparatus according to the present embodiment uses the optical deflector according to the first embodiment for the optical deflector 7. That is, it includes the high-precision polygon mirrors so that it is able to reduce the inclination of the axis of the optical deflector and prevent the positions of the light beams passing through the scan lenses from shifting. For this reason, warranty for optical property of the first scan lenses and second scan lenses can be necessity minimum.

As a result, it is able to reduce the thickness of the first scan lenses and second scan lenses as well as to improve a manufacturing rate for non-defective lenses, and reduce the burdens on the environment accordingly. Further, the optical scan apparatus need not be provided with a dedicated mechanism for correcting the inclination of the axis. Moreover, it is possible to reduce the number of components and the materials of the light source, leading to suppressing a failure rate of the light source and reducing the burdens on the environment.

Third Embodiment

Next, with reference to FIGS. 11 and 12, an image formation apparatus according to the third embodiment will be described in detail. The third embodiment concerns an image formation apparatus in which the optical scan apparatus according to the second embodiment is mounted. With such a configuration, it is possible to reduce vibration and noise of the optical scan apparatus, as well as to reduce the number of components and materials of the light source, leading to reducing the burdens on the environment. Such an image formation apparatus can form images with high quality.

Figure 11:
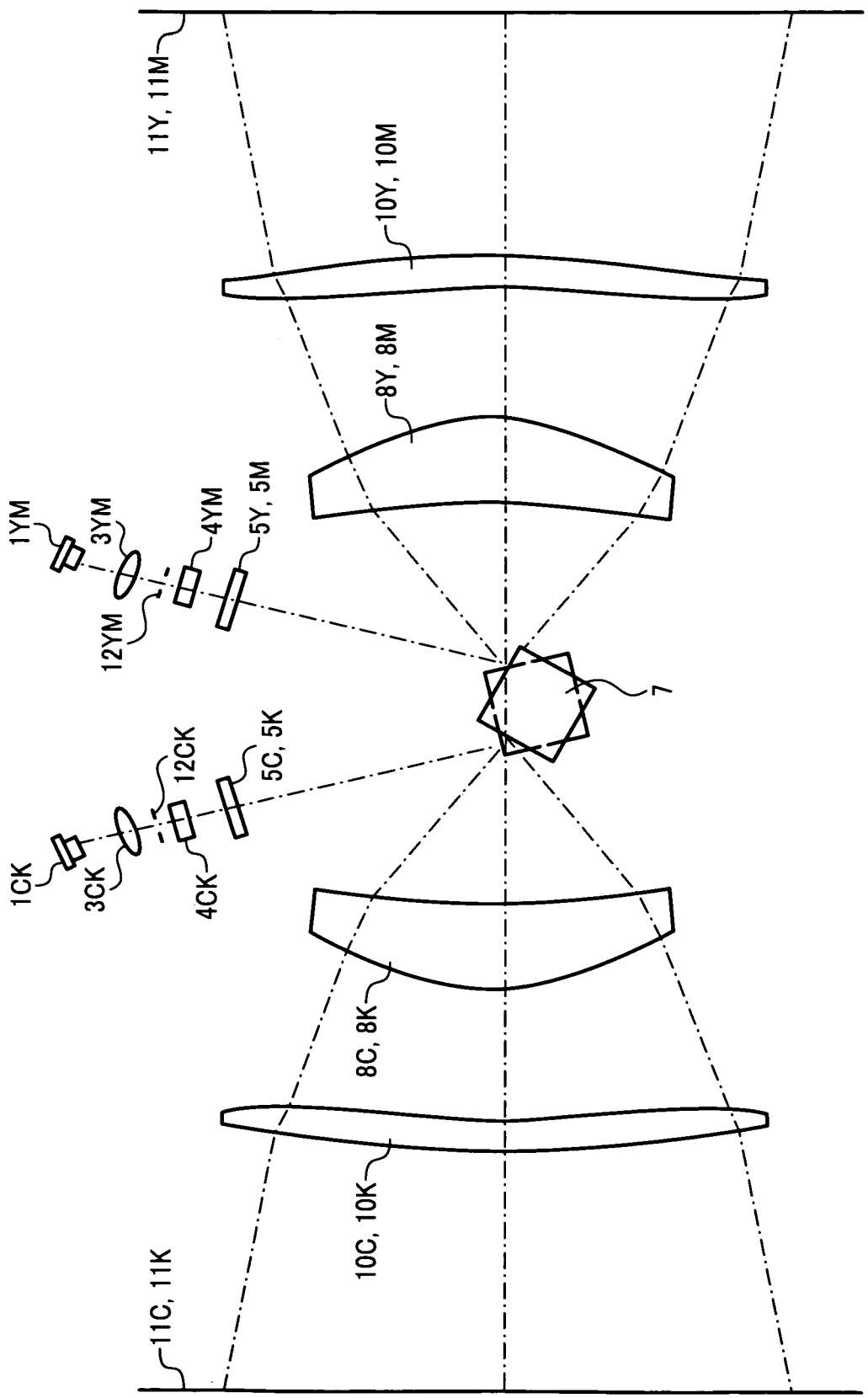
FIG. 11 shows a structure of an optical scan apparatus mounted in an image formation apparatus according to a third embodiment of the present invention.

FIG. 11 is a plain view of an optical system of the optical scan apparatus, seen from the sub scan direction, that is, the rotation axis direction of the optical deflector 7. For the sake of simplicity, bending mirrors on optical paths from the optical deflector to the scan position is omitted from the drawing and optical paths are represented by straight lines. The optical scan apparatus according to the present embodiment includes two light sources (m=2), one light beam (p=1), two split light beams (q=2), and four scanning objects (n=4) as four photoconductive drums 11Y, 11M, 11C, 11K, to scan the objects with the light beams, respectively. The electrostatic latent images formed on the four photoconductive drums 11Y, 11M, 11C, 11K are individually visualized with toners equivalent to yellow, magenta, cyan, black colors to thereby form color images.

In FIG. 11, the codes 1YM, 1CK represent semiconductor lasers each of which emits a single light beam. The intensity of the semiconductor laser 1YM is modulated with an image signal corresponding to a yellow color image and an image signal corresponding to a magenta color image alternatively. The intensity of the semiconductor laser 1CK is modulated with an image signal corresponding to a cyan color image and an image signal corresponding to a black color image alternatively.

The light beams emitted from the semiconductor laser 1YM are made parallel by a coupling lens 3YM and pass through an aperture 12YM to be adjusted; then, they are incident on a beam splitter prism 4YM to be split into two separate light beams in the sub scan direction. The beam splitter prism 4YM is the same as the beam splitter prism 4 in FIG. 8. One of the split beams is used for forming an electrostatic latent image corresponding to a yellow color image and the other is used for forming an electrostatic latent image corresponding to a magenta color image.

The split light beams in the sub scan direction are gathered in the sub scan direction by cylindrical lenses 5Y, 5M which are arranged to overlap with each other in the sub scan direction, and are incident on the optical deflector 7. The optical deflector 7 is the same as the one in FIGS. 7, 9 and includes an upper polygon mirror and a lower polygon mirror with four deflection surfaces so that they are superimposedly disposed in two stages and integrated with each other with the two-staged deflection surfaces shifted from each other by a predetermined angle in the rotation direction. The cylindrical lenses 5Y, 5M form a linear image long in the main scan direction near the deflection surface of the upper polygon mirror.

The light beams deflected by the optical deflector 7 transmit through the first scan lenses 8Y, 8M and the second scan lenses 10Y, 10M and form light spots on the photoconductive drum 11Y, 11M by the action of the above lenses for scanning.

Likewise, the light beams emitted from the semiconductor laser 1CK are made parallel by a coupling lens 3CK and passes through an aperture 12CK to be adjusted; then, they are incident on a beam splitter prism 4CK to be split into two separate light beams in the sub scan direction. The beam splitter prism 4CK is the same as the beam splitter prism 4YM. One of the split beams is used for forming an electrostatic latent image corresponding to a cyan color image and the other is used for forming an electrostatic latent image corresponding to a black color image.

The split light beams in the sub scan direction are gathered in the sub scan direction by cylindrical lenses 5C, 5K which are arranged to overlap with each other in the sub scan direction, and are incident on the optical deflector 7. The light beams deflected by the optical deflector 7 transmit through the first scan lenses 8C, 8K and the second scan lenses 10C, 10K and form light spots on the photoconductive drum 11C, 11K by the action of the above lenses for scanning.

Figure 12:
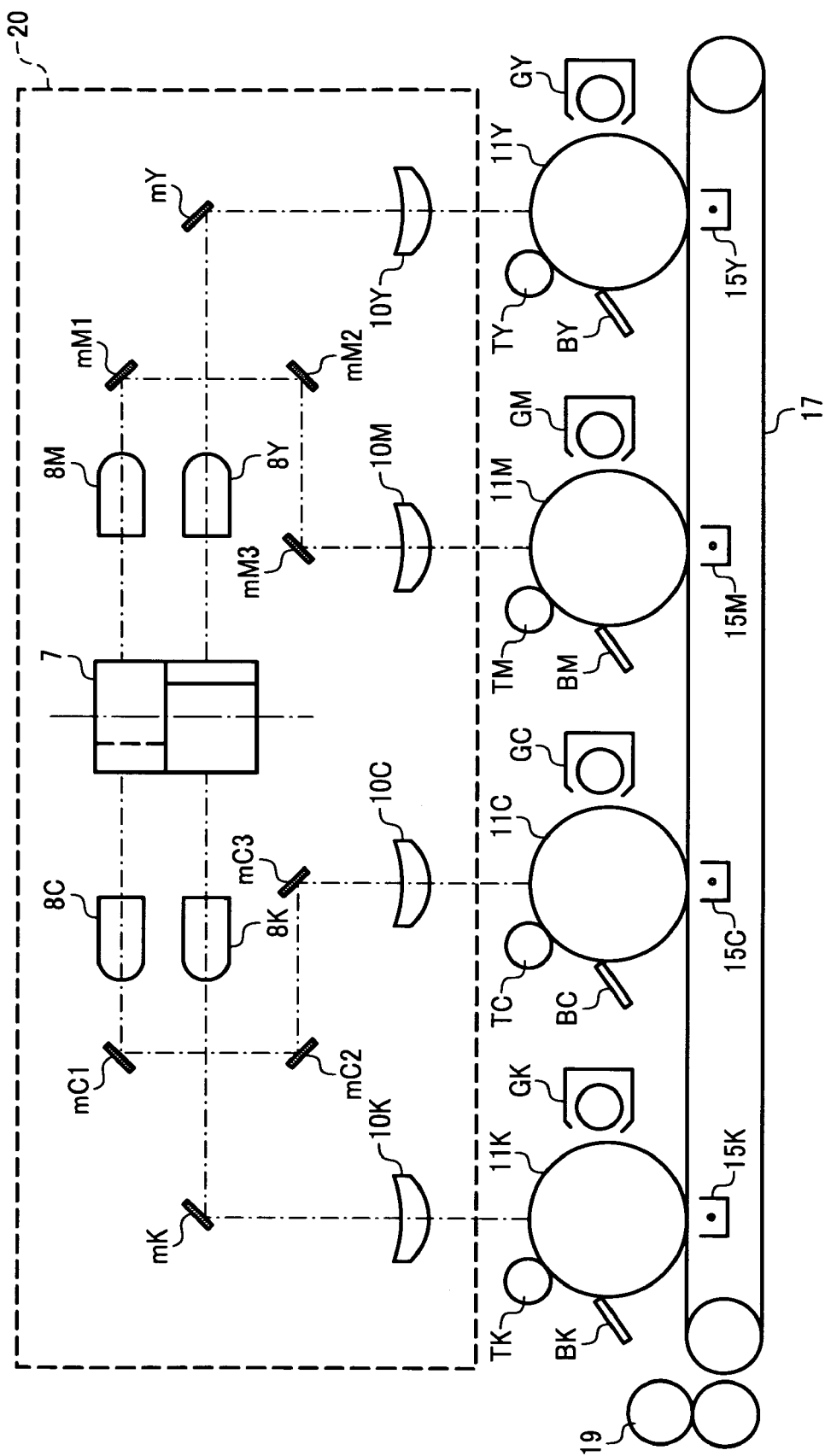
FIG. 12 shows a structure of the image formation apparatus according to the third embodiment of the present invention.

FIG. 12 is a side view of the image formation apparatus. In the drawing an area indicated by broken lines represents an optical scan apparatus 20 which has been described with reference to FIG. 10. As shown in the drawing, one of the light beams deflected by the upper polygon mirror of the optical deflector 7 is guided through an optical path flexed by bending mirrors mM1, mM2, mM3 to the photoconductive drum 11M while the other of the light beams is guided through an optical path flexed by bending mirrors mC1, mC2, mC3 to the photoconductive drum 11C.

Similarly, one of the light beams deflected by the lower polygon mirror of the optical deflector 7 is guided through an optical path flexed by a bending mirror mY to the photoconductive drum 11Y while the other of the light beams is guided through an optical path flexed by a path flexing mirror mK to the photoconductive drum 11K.

Accordingly, the light beams from the two semiconductor lasers 1YM, 1CK is split into two by the beam splitter prisms 4YM, 4CK, respectively, and the photoconductive drums 11Y, 11M, 11C, 11K are scanned with the four light beams. The photoconductive drums 11Y, 11M are scanned with the two split light beams from the semiconductor laser 1YM alternatively in accordance with the rotation of the optical deflector 7. The photoconductive drums 11C, 11K are scanned with the two split light beams from the semiconductor laser 1CK alternatively in accordance with the rotation of the optical deflector 7.

The photoconductive drums 11Y, 11M, 11C, 11K are rotated clockwise at a constant speed and uniformly charged by charge rollers TY, TM, TC, TK as electric chargers. The charged photoconductive drums 11Y, 11M, 11C, 11K are scanned with their respective light beams, to have yellow, magenta, cyan, black color images written thereon and respective electrostatic latent images (negative latent images) formed thereon.

The electrostatic latent images are inversely developed by developers GY, GM, GC, GK to form a yellow toner image, a magenta toner image, a cyan toner image, and a black toner image on the photoconductive drums 11Y, 11M, 11C, 11K, respectively. The respective toner images are transferred on a not-shown transfer sheet. That is, the yellow toner image formed on the photoconductive drum 11Y is transferred by a transfer device 15Y onto the transfer sheet carried by a carrier belt 17. Similarly, the magenta toner image, cyan toner image, and black toner image on the photoconductive drums 11M, 11C, 11K are transferred by transfer devices 15M, 15C, 15K in sequence, respectively.

Through the above process, the yellow toner image, magenta toner image, cyan toner image, and black toner image are superimposed on the transfer sheet to compositionally form a color image. The color image is fused on the transfer sheet by a fuser 19.

That is, the image formation apparatus according to the present embodiment is of a tandem type which individually forms electrostatic latent images on the plurality of photoconductive drums by optical scanning, visualizes the electrostatic latent. images as toner images and transfers the toner images on the same transfer sheet, to thereby compositionally form images. It has the four photoconductive drums and the optical scan apparatus with the two light sources 1YM, 1CK and is configured so that the two photoconductive drums are scanned with the light beams from the two light sources, respectively. With such a configuration, color images are formed by forming the electrostatic latent images corresponding to magenta, yellow, cyan, black colors on the four photoconductive drums 11Y, 11M, 11C, 11K and individually visualizing them with toners of magenta, yellow, cyan, black colors.

Note that the optical deflector 7 in the image formation apparatus according to the present embodiment is the optical deflector described in the first embodiment.

The image formation apparatus according to the present embodiment includes the optical scan apparatus which can form images with high precision and high quality. In addition, by reducing the number of components and materials of the light source of the optical scan apparatus, it is possible to provide a single beam optical scan apparatus with less failure rate of the light source and less burdens on the environment. The image formation apparatus including such an optical scan apparatus generates less noise and forms images in high quality.

The photoconductive drums according to the present embodiment are scanned with a single light beam, however, they can be scanned with a plurality of light beams by configuring each of the light sources as in FIG. 7.

The control operations in the above embodiments are made by hardware; however, they are feasible by software such as a computer program or the like. For example, it can be configured that a control device reads the program stored in an optical, magnetic, optical magnetic or semiconductor storage medium to execute the control operations. Alternatively, the control device can be also configured to execute the control operations by reading the program from an external device connected via a predetermined network.

The rotary drive apparatus, optical scan apparatus and image formation apparatus are applicable to image formation apparatuses such as a copier or a printer.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A rotary drive apparatus comprising:
a rotary body with a support portion;
a rotor magnet supported by the support portion of the rotary body;
a fixation section facing the rotor magnet and rotatably supporting the rotary body; and
a winding coil provided in the fixation section, wherein the following expression (1) is satisfied:

$E1/E2 \leq 0.75$ where Young's modulus of the rotor magnet is E1 [GPa], and Young's modulus of the support portion is E2 [GPa].

2. A rotary drive apparatus according to claim 1, wherein the following expression (2) is satisfied:

$10 \leq \phi d \leq 30$ where an outer diameter of the rotor magnet is $\phi d$ [mm].

3. A rotary drive apparatus according to claim 1, wherein the support portion is made of a nonmagnetic metal material.

4. A rotary drive apparatus according to claim 3, wherein the metal material is an aluminum alloy.

5. A rotary drive apparatus according to claim 1, wherein the rotor magnet is a rare-earth bond magnet.

6. A rotary drive apparatus according to claim 1, wherein the rotor magnet is formed by injection molding.

7. A rotary drive apparatus according to claim 1, wherein the following expression (3) is satisfied:

$0.8 \leq \alpha 1/\alpha 2 \leq 1.5$ where a linear expansion coefficient of the rotor magnet is $\alpha 1$, and a linear expansion coefficient of the support portion is $\alpha 2$.

8. A rotary drive apparatus according to claim 1, wherein the rotor magnet is press-fitted into the support portion and supported by the support portion.

9. A rotary drive apparatus according to claim 1, wherein; the rotor magnet is attached to the support portion by an adhesive; and
the adhesive is 70 or more in type-D durometer hardness defined by JIS-K-7215.

10. A rotary drive apparatus according to claim 1, wherein the rotary body has a polygon mirror fixed thereto.

11. An optical scan apparatus comprising:
an optical deflector comprising a polygon mirror and rotating around a predetermined rotation axis to scan a scanning plane with a light beam; and
a rotary drive apparatus comprising a rotary body with a support portion, a rotor magnet supported by the support portion of the rotary body, a fixation section facing the rotor magnet and rotatably supporting the rotary body, and a winding coil provided in the fixation section, to rotate the optical deflector, in which an expression (1), $E1/E2 \leq 0.75$ is satisfied where Young's modulus of the rotor magnet is E1 [GPa], and Young's modulus of the support portion is E2 [GPa].

12. An image formation apparatus comprising:
the optical scan apparatus according to claim 11;
a photoreceptor on which an electrostatic latent image is formed on a scanned surface by the optical scan apparatus;
a developer section which visualizes, as a toner image, the electrostatic latent image formed on the scanned surface of the photoreceptor; and
a transfer section which fuses the toner image visualized by the developer section on a recording medium.

* * * * *